United States Patent [19]

Skogler

[11] 4,275,916
[45] Jun. 30, 1981

[54] VISOR WITH STORAGE COMPARTMENT

[75] Inventor: Brian I. Skogler, Holland, Mich.

[73] Assignee: Prince Corporation, Holland, Mich.

[21] Appl. No.: 31,548

[22] Filed: Apr. 19, 1979

[51] Int. Cl.³ ............................................... B60J 3/00
[52] U.S. Cl. .................................. 296/97 H; 133/5 R
[58] Field of Search ................ 296/97 B, 97 C, 97 G, 296/97 H, 97 R; 133/5 R, 5 A

[56] References Cited

U.S. PATENT DOCUMENTS

| 2,148,557 | 2/1939 | Hook | 296/97 C |
| 2,395,592 | 2/1946 | Tierney | 296/97 C |
| 2,547,101 | 4/1951 | Uttz | 296/97 C |
| 2,600,961 | 6/1952 | Biehl | 133/5 R |
| 4,075,468 | 2/1978 | Marcus | 296/97 H |

FOREIGN PATENT DOCUMENTS 1099694  1/1968  United Kingdom ................ 296/97 R Primary Examiner—David M. Mitchell
Assistant Examiner—John A. Carroll
Attorney, Agent, or Firm—Price, Heneveld, Huizenga & Cooper

[57] ABSTRACT

A visor includes a recess for receiving a unitary storage compartment with a pivoted cover within the visor body. The compartment includes pockets for receiving objects such as sunglasses and the like.

9 Claims, 5 Drawing Figures

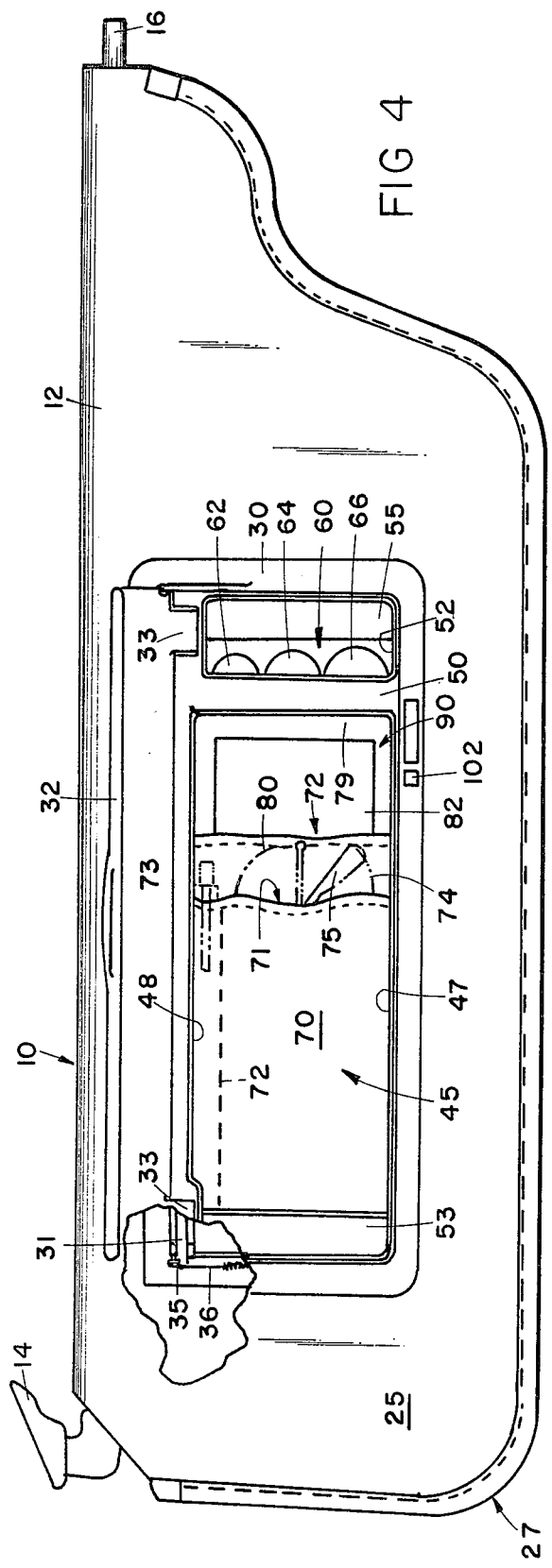
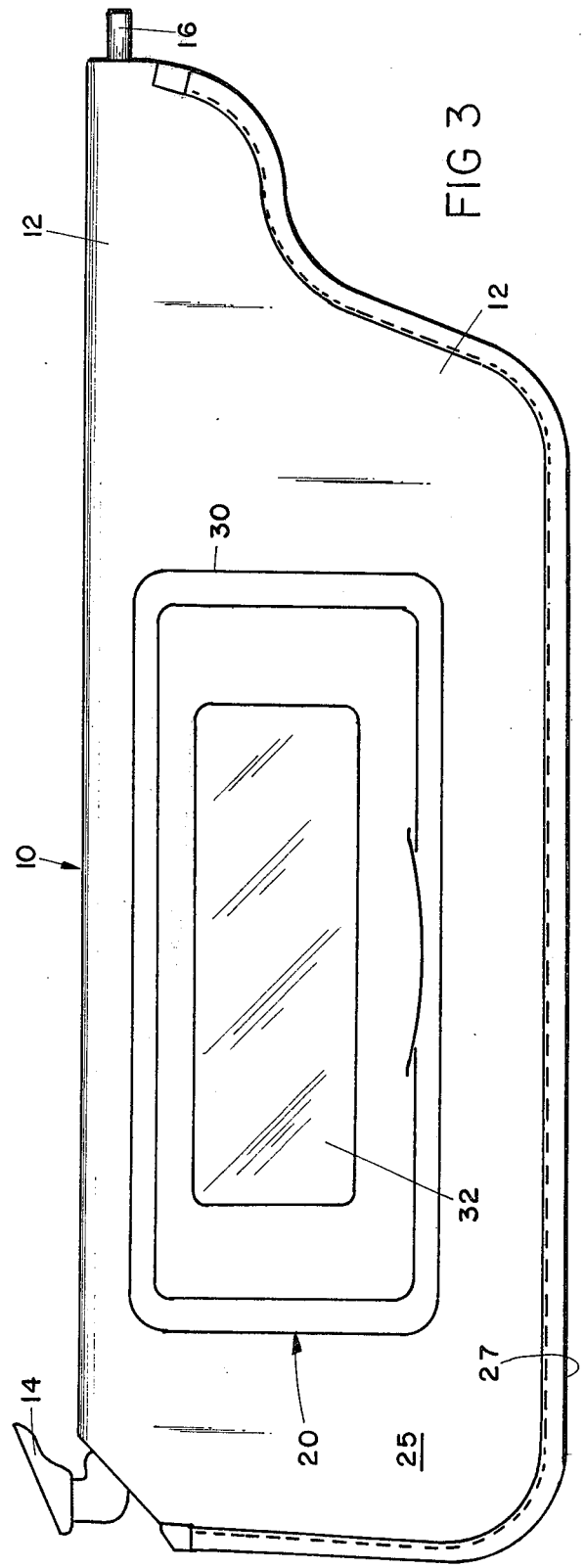

VISOR WITH STORAGE COMPARTMENT

BACKGROUND OF THE INVENTION

The present invention relates to vehicle visors and particularly to a visor having a covered storage compartment mounted therein.

It has long been recognized that the visor is a convenient location for the storage of small personal articles such as combs, eyeglasses, or the like. Typically, visors have been provided with pockets, flaps, or trays mounted therein for receiving such articles. Representative of this prior art are U.S. Pat. No. 1,990.413, issued Feb. 5, 1935, to P. E. Michaelis, U.S. Pat. No. 2,148,557, issued Feb. 28, 1939, to H. C. Hook, British Pat. No. 1,099,694, of Apr. 2, 1965, and Swiss Pat. No. 474,381, of Nov. 20, 1968. The approach used by this representative prior art typically is to provide attachments to the upholstered surface of the visors although the Michaelis patent provides a two-piece visor with one piece forming a tray for containing the articles to be stored.

When such prior art includes an opening flap or tray, they open in a downward direction which obstructs the view of the vehicle operator and, therefore, is unsafe. Further, the relatively early efforts represented by some of this prior art pose additional safety hazards which no longer would be acceptable to the current automotive industry standards.

SUMMARY OF THE PRESENT INVENTION

The system of the present invention provides a visor storage system which is a compact covered storage compartment which can be mounted directly within a recess formed in a visor body and which includes a cover opening upwardly when the visor is in a lowered position thereby not interfering with the driver's visibility. Further, the visor and storage compartment assembly of the present invention provides a compact, neat appearing system which meets today's automotive safety standards.

Systems embodying the present invention include a visor body having a recess formed therein for receiving a storage compartment and with a pivoted cover which opens toward the vehicle headliner to provide access to articles stored within the compartment without obstructing the operator's visibility. The storage compartment of the preferred embodiment includes sectionalized compartments for receiving individual articles.

It is an object of the present invention, therefore, to provide a covered storage compartment within the body of a vehicle visor. A feature of the present invention is the provision of a storage compartment and pivoted cover which can be mounted within a recess of a visor body. Some advantages of the present invention are that a visor and storage compartment is provided which is compact, attractive, meets current safety standards, and is easy to use by the vehicle operator when the vehicle is in use.

These and other objects, features, and advantages of the present invention will best be understood by reference to the following description thereof, together with the drawings, in which:

BRIEF DESCRIPTION OF THE DRAWINGS

FIG. 3 is a front elevational view of a visor of the present invention showing the storage compartment with the cover in a closed position;

FIG. 4 is a front elevational view of the structure shown in FIG. 3 with the cover shown in an opened position.

DETAILED DESCRIPTION OF THE PREFERRED EMBODIMENT

Figure 1:
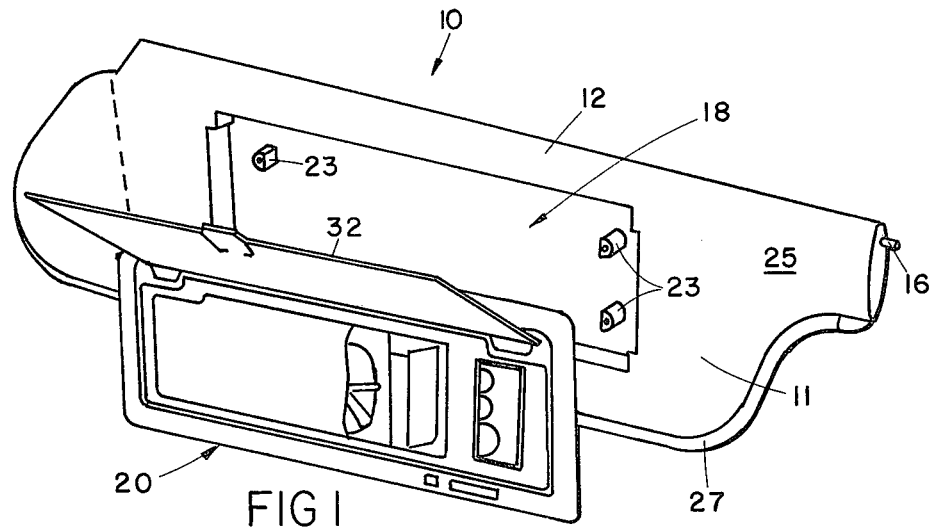
FIG. 1 is an exploded perspective view of the system of the present invention.
Figure 2:
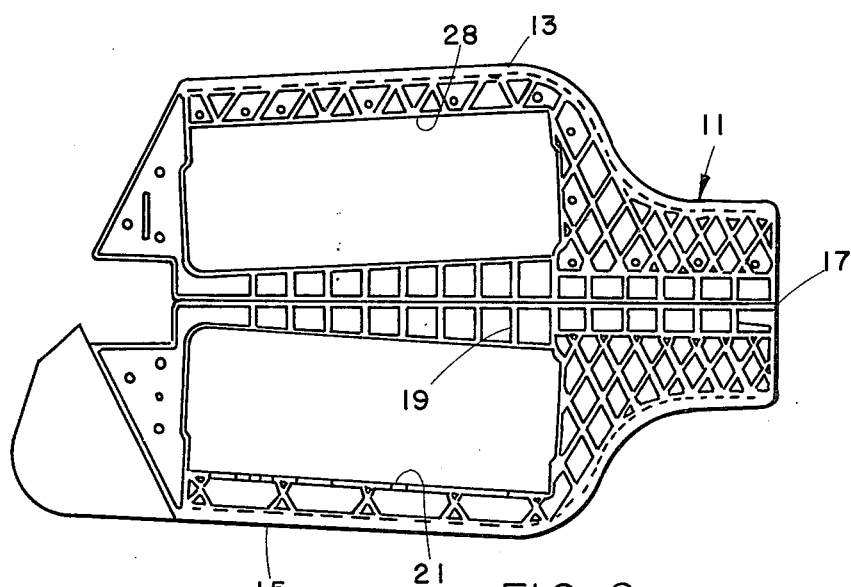
FIG. 2 is a front elevational view of a core incorporated in the visor shown in FIG. 1.

Referring initially to FIGS. 1 and 2, there is shown a visor assembly 10 comprising a visor body 12 with a pivot mounting bracket 14 at one end for pivotally mounting the visor assembly to the headliner of a vehicle. The opposite end of the visor includes a support post 16 for supporting the visor in a bracket centrally positioned in the headliner for holding the visor in a position along the top of the front windshield. The visor body 12 includes a generally rectangular recess 18 extending inwardly into the visor body from the rear surface 11 for receiving therein the covered storage compartment assembly 20 of the present invention.

Visor body 12 includes a core 11 (FIG. 2) molded of a suitable polymeric material such as polypropylene and comprising core halves 13 and 15 joined by an integral polymeric hinge 17. Core half 13 includes a rectangular aperture 28 defining the opening of recess 18 as viewed in FIG. 1. Reinforcing ribs 19 space halves 13 and 15 apart. Half 15 includes a rectangular opening 21 surrounded by the ribs 19 defining in part, together with aperture 28, recess 18. The visor body 10 and core 11 can be manufactured of a construction substantially similar to that disclosed in U.S. Pat. No. 4,000,404, issued Dec. 28, 1976, to Marcus, and U.S. Pat. No. 4,075,468, issued Feb. 21, 1978, to Marcus, both of which are assigned to the present assignee, the disclosures of which are incorporated herein by reference.

Figure 5:
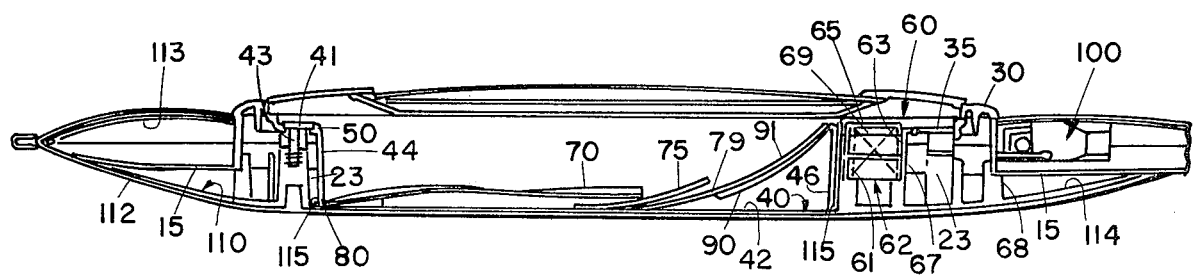
FIG. 5 is a fragmentary cross-sectional view taken along section lines V—V of FIG. 4.

Beneath half 15 of the visor body core there is provided a front panel 110 shown in FIG. 5 and which has generally upwardly, concavely curved ends 112 and 114 to provide a generally curved visor with the fabric covered outer surface of the front panel 112 defining the exposed surface of the visor when in a stored, upright position against the vehicle headliner. Integrally formed in the panel 110 are four spaced upwardly extending mounting bosses 23 for receiving the storage compartment subassembly 20 as described in greater detail below. Also, integrally formed in the front panel 110 is a generally annular and upwardly extending shoulder 67 for receiving coin dispensing assemblies 60 associated with the storage compartment. Spaced inwardly from opposite edges of the mounting boss 23 at the left end as viewed in FIG. 5 and of the annular shoulder 67 at the right side is a pair of U-shaped slots 115 extending laterally across the floor 40 of the storage compartment defined in part by the inner surface of front panel 110. The U-shaped slots 115 are defined by a pair of parallel ridges spaced apart sufficiently to receive sidewalls 44 and 46 of the storage compartment assembly as shown in FIG. 5 and as described in greater detail below. Panel 110 also includes an upwardly extending ledge 68 for supporting a garage door opening transmitter 100. When core halves 13 and 15 are folded together and front panel 110 added, a suitable upholstery covering 25 is applied to the exterior surface of the visor body and the peripheral edge is trimmed by a suitable trim bead 27 (FIGS. 1 and 2).

The storage compartment assembly 20 comprises as is best seen in FIGS. 4 and 5, a generally rectangular frame 30 to which there is pivotally coupled a rectangular cover 32 such that the cover can be moved from a closed position as shown in FIG. 3 to an opened position as shown in FIGS. 1 and 4. For such purpose, along the top edge of the cover there is provided a pair of bosses 33 and 35 from which there outwardly extends pivot axles 31 (one shown in FIG. 4) with a crank arm 35 attached to the free end of each axle. The crank arm includes an aperture for receiving one end of a tension spring 36 therein, the opposite end of which is anchored to the back of frame 30. The crank arm 35 extends from the axles in a manner such that the springs 36 on either end of the cover 32 tend to hold the cover in a closed position but as it is opened, the crank arm moves over-center and the springs 36 tend to urge the cover to the fully opened position as shown in FIGS. 1 and 4. The construction of the cover and its mounting to the rectangular frame can be identical to that disclosed in the above identified U.S. Pat. No. 4,075,468, or can take the form of construction also disclosed in co-pending U.S. patent application Ser. No. 958,968, entitled COVERED VISOR MIRROR, filed Nov. 9, 1978, and assigned to the present assignee, the disclosures of which are incorporated herein by reference.

The storage compartment comprises, in addition to the frame and cover, left and right sidewalls 44 and 46, a lower wall 47, and an upper wall 48, all integral with frame 30 and extending inwardly and then downwardly from the inner edge of the frame. The horizontally extending junction of the walls with frame 30 define a rectangular flange 50 (FIG. 5) extending around the inner periphery of the frame. Flange 50 on the right side of the tray as viewed in FIG. 4, is elongated and includes therein a rectangular opening 52 permitting access to a spring loaded change dispensing assembly 60. As best seen in FIGS. 4 and 5, flange 50 and its integral frame 30 are secured to the mounting bosses 23 on panel 110 by means of screws 41 extending through apertures 43 formed at spaced locations within the flange 50 to align with the mounting bosses 23. The screws 41 are then covered by decorative snap-in panels 53 and 55 on the left and right edges of the tray, respectively, as best seen in FIGS. 4 and 5. Panel 55 partly encloses aperture 52 in the right side of flange 50 allowing, however, sufficient room for coins and the spring-loaded coin mechanism 60 to be accessible as best seen in FIG. 4.

The coin loading mechanism comprises three substantially identically configured but differently sized subassemblies 62, 64, and 66 for receiving dimes, nickels, and quarters, respectively. Assembly 62 is shown in FIG. 5 and includes a coin receiving cup 61 resting on annular shoulder 67 from panel 110, a compression spring 69, and a cap 65 which defines a movable floor against which coins can be urged downwardly within the cup 61. Circular, vertically, downwardly extending sidewalls 63 integrally formed within flange 50 receives the force-fitted cap from the back side (in an upwardly direction as shown in FIG. 5) of the flange 50 prior to mounting of the storage compartment within the visor recess 18.

The opened central area 45 of the storage compartment includes, as best seen in FIGS. 1, 4, and 5, a pair of fabric pockets 71 and 77 defined in part by an outer fabric panel 70 stitched along edge 72 to an inner fabric panel 75 to define a narrow, elongated third pocket 76 for receiving a pencil or pen 73. The larger, rectangular pocket 71 receives items such as sunglasses 74. Pocket 77 receives items such as eyeglass cleaning tissue 82. The fabric panels 70 and 75 are stitched together along their mating peripheral edges with one edge 80 being compressibly held in slot 115 by the end of wall 44 as seen in FIG. 5. The remaining edges of the panels are likewise secured in slots (not shown) which extend longitudinally at opposite edges of the recess under walls 47 and 48 to secure the fabric article holding means in place. A third fabric panel 79 covers and is suitably bonded to the floor of the recess and the surface 91 of a wall 90 described below.

In order to assist the removal of flat flexible material such as item 82, a curved polymeric partial wall 90 (FIG. 5) is integrally formed to the compartment and extends between walls 47 and 48. Wall 90 facilitates removal of such items by providing a curvilinear surface 91. Thus, as the items are removed, the leading edge is pushed away and out of pocket 72 as it follows the upwardly inclined surface 91 of wall 90.

In the embodiment shown, the visor core body also includes a garage door opening transmitter 100 with a controlling switch 102 extending from the edge of frame 30 for activating the transmitter 100 for use in opening a garage door or other remotely controlled device.

Thus, with this system, a visor body is provided with a recess and a cover with means for pivotally coupling the cover to the visor body between a closed position covering the recess and an opened position providing access to means within the recess for storing articles such as sunglasses and the like within the visor body.

It will become apparent to those skilled in the art that various modifications to the preferred embodiment of the invention described and disclosed herein can be made without departing from the spirit or scope of the invention as defined by the appended claims.

The embodiments of the invention in which an exclusive property or privilege is claimed are defined as follows:

1. A visor assembly including a covered storage compartment comprising:
   a visor body having a recess formed therein, said recess extending across a substantial portion of the frontal area of said visor and extending to a substantial depth within said visor;
   mounting means disposed within said recess; and
   a storage subassembly received in said recess and secured therein with said mounting means comprising:
   a frame extending into said recess said frame being shaped to fit around the peripheral edge of said recess and said frame including sidewalls extending into said recess;
   a storage means disposed on said frame for mounting within said recess said storage means extending across a substantial portion of the frontal area of said visor and extending to a substantial depth within said visor, said storage means substantially filling said recess;
   a cover disposed on said frame; and
   means for pivotally mounting said cover to said frame, said cover being pivotally mounted about an axis disposed above said recess on said visor whereby said cover is reciprocally pivotable upward to provide access to said storage means mounted within said recess and is pivotable downward to a closed position covering said storage means.

2. The apparatus as defined in claim 1 wherein said frame is generally rectangular and wherein said storage means are secured within said recess by at least one of said walls.

3. The apparatus as defined in claim 2 wherein said visor body includes a core having an aperture defining said recess and a panel covering one side of said core and defining a floor for said recess.

4. The apparatus as defined in claim 3 wherein said storage means includes fabric panels joined to define pockets for receiving items to be stored in the storage compartment.

5. The apparatus as defined in claim 4 wherein said storage means further includes change dispensing means.

6. A visor assembly including a covered storage compartment comprising:
 a visor body having a recess formed therein;
 a cover and means pivotally mounting said cover to move between a closed position over said recess and an opened position providing access to the space within said recess;
 storage means positioned in said recess for holding articles within the visor;
 said cover opening in an upward direction when said visor body is in a lowered position;
 said means for pivotally mounting said cover comprising a frame and said cover including axle means cooperating with said frame for pivotal motion between a closed and an opened position;
 said frame being generally rectangular and including walls extending inwardly into said recess and said storage means being secured within said recess by at least one of said walls;
 said visor body including a core having an aperture defining said recess and a panel covering one side of said core and defining a floor for said recess;
 said storage means including fabric panels joined to define pockets for receiving items to be stored in the storage compartment; and
 said storage means further including a curvilinear wall extending between a pair of opposite walls of said frame and curved in a direction to urge articles outwardly away from said pockets when being removed.

7. The apparatus as defined in claim 6 wherein said storage means further includes change dispensing means.

8. A storage compartment for insertion into a recess in a visor body comprising:
 a frame shaped to fit around the peripheral edge of a recess in a visor, said frame including sidewalls extending from said frame into the visor recess;
 a cover movably mounted to said frame for opening in a direction which does not obscure the vision of an occupant using the storage compartment when said cover is in an opened position;
 means coupled to said frame and behind said cover for holding objects;
 means for securing said frame to a visor;
 said cover being pivotally mounted to one edge of said frame;
 said cover opening in an upward direction when said visor body is in a lowered position;
 said holding means including fabric panels joined to define pockets for receiving items to be stored in the storage compartment; and
 said holding means further including a curvilinear wall extending between a pair of opposite walls of said frame and curved in a direction to urge articles outwardly away from said pockets when being removed.

9. The apparatus as defined in claim 8 wherein said holding means further includes change dispensing means.

* * * * *